Fig. 1.A 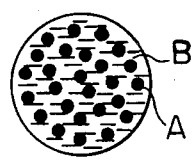
Fig. 1.B 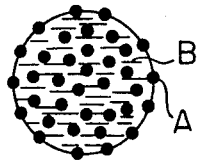
Fig. 1.C 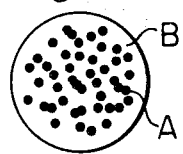
Fig. 1.D 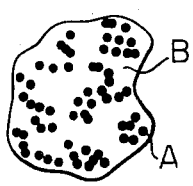
Fig. 1.E 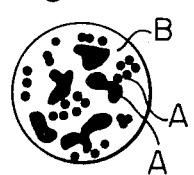
Fig. 1.F 
Fig. 1.G 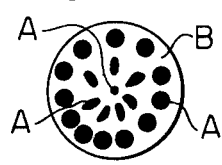
Fig. 1.H 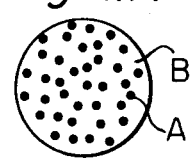
Fig. 1.I 
Fig. 1.J 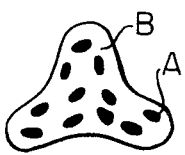
Fig. 1.K 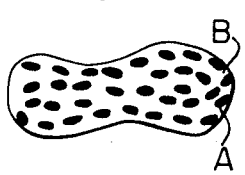
Fig. 1.L 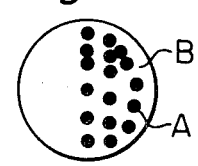
Fig. 1.M 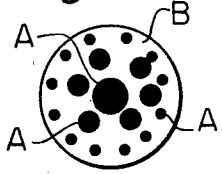
Fig. 1.N 
Fig. 1.O 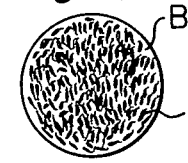

United States Patent Office 3,706,613
Patented Dec. 19, 1972

3,706,613
METHOD FOR PRODUCING COMPOSITE SHEETS COMPOSED OF POLYMERIC FIBERS AND ELASTIC MATERIAL
Masamichi Toki, Otsu-shi, Toyohiko Hikota, Kyoto-shi, and Miyoshi Okamoto, Otsu-shi, Japan, assignors to Toray Industries, Inc., Tokyo, Japan
Filed Jan. 13, 1969, Ser. No. 790,808
Claims priority, application Japan, Jan. 13, 1968, 43/1,698
Int. Cl. B29c 27/00
U.S. Cl. 156—85                                    38 Claims

ABSTRACT OF THE DISCLOSURE

A composite sheet substance having the similar appearance and physical properties to the genuine leather is manufactured by means of using fibrous material composed of a plurality of fine fibers or filament and an elastic polymer surrounding the fine fibers. A bonded fibrous material composed of fibrous component (A component) containing a plurality of fine fibers or filaments and another component of bonding agent (B component) bound the above-mentioned fine fibers or filaments in a bundle. Further a sheet composed of the bonded fibrous material is made. The A component has different dissolving property by solvent from the B component. Next the above-mentioned sheet is involved with a polymer (C component) having a different solvent dissolving property from the A and B components. The B component is taken out from the product of the involving treatment by means of dissolving into a solvent having particular ability for dissolving the B component only. Next a substance mainly composed of an elastic polymer (D component) is impregnated into the sheet after taking out the B component, further the C component is taken out from the sheet by means of dissolving into a solvent having particular ability for only dissolving the C component after the abovementioned impregnating treatment, and finally the composite sheet substance of the purpose is produced. In the abovementioned manufacturing steps, the similar results can be obtained by applying the different combination of the steps to the genuine leather, in other words the operating order of the taking out operation of the B component and the impregnation operation of the elastic polymer (D component) can be changed.

---

Figure 2:
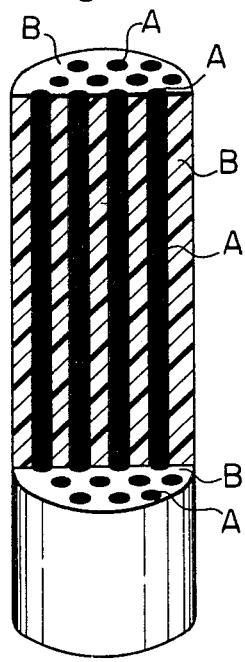

The present invention relates to a method for producing a composite sheet substance comprising fine fibers or filaments and an elastic polymer, and more particularly relates to a method for producing a composite sheet substance comprising numerous bundles of fine fibers or filaments, which are converted from a bonded fibrous material consisting of at least two polymeric components having soluble properties different from each other, and an elastic polymer constituent incorporating the fine fibers or filament bundles into a sheet substance having excellent qualities similar to the natural leather.

A composite sheet substance composed of a fibrous material and an elastic substance has been utilized heretofore as a synthetic leather, and many processes of producing the abovementioned synthetic leather have been developed. However, the resultant products of the abovementioned process have certain defects such as poor softness or a high bending fatigue property etc. In a certain process for producing the composite substance, the elastic substance and the fibrous material are closely bonded. Therefore when a certain deformation is applied to the product, the fibers are so severely restricted in their free displacement from each other that the resistance to the deformation of the product is increased and an excess stress is applied to the fibers and the elastic substance itself or the bonding points of the fibers with the elastic substance. Such restricted deformation is responsible for the lack of softness and the degradation of the bending fatigue property of the product. Further, it was impossible to produce the synthetic leather having a soft hand feeling and physical properties like approaching those of natural leather, because of the substantial difference in composition in comparison with that of natural leather.

The above-mentioned term "fibers and filaments" is referred to hereinafter as "fibers."

The principal object of the present invention is to provide an improved process for producing a composite sheet substance having a different configuration from the conventional synthetic leather, that is which is composed of numerous bundles of fine fibers and having elastic material impregnating these bundles of fibers so as to attain properties similar to those of natural leather.

Another object of the present invention is to produce a composite sheet substance having a configuration which permits a certain freedom of relative movement of the component fibers so as to create a softness similar to that of natural leather.

Still another object of the present invention is to provide a composite sheet substance composed of numerous bundles of fine fibers and elastic material impregnating these bundles of fibers so as to prepare a sheet material which is suitable for manufacturing the final products and is capable of easy handling during the subsequent process.

The details of the present invention will be more clearly apparent through reference to the following description when taken in connection with the accompanying drawings, in which.

Figure 3:
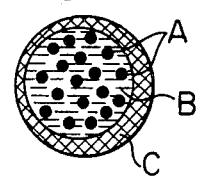
Figure 4:
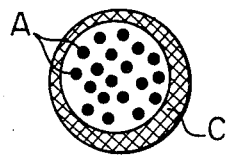

FIGS. 1A to 1.0 are sectional views of several embodiments of the bonded fibrous material usable for the present invention composed of numerous fine fibers and a bonding agent binding together the fine fibers, FIG. 2 is an enlarged perspective view, partly in section, of the bonded fibrous material as shown in FIG. 1, FIG. 3 is a sectional view of bonded fibrous material which is covered by a first impregnating substance hereinafter defined in detail, FIG. 4 is a sectional view of the impregnated fibrous material shown in FIG. 3 after removing the bonding agent in the fibrous material by dissolving off with a solvent.

Figure 5:
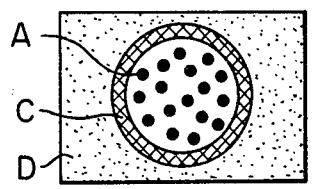
Figure 7:
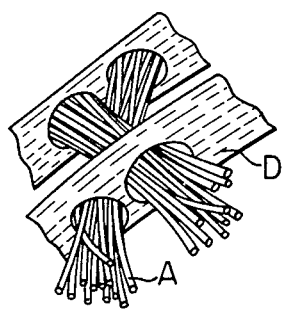
Figure 6:
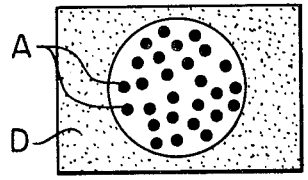
Figure 8:
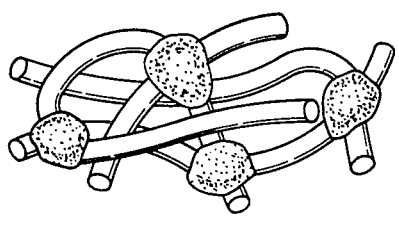
Figure 9:
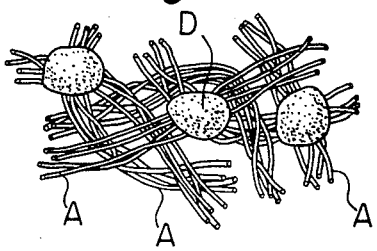
Figure 10:
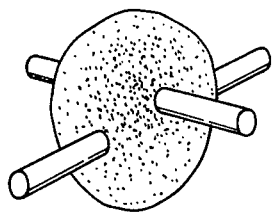
Figure 11:
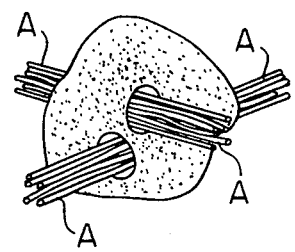
Figure 12:
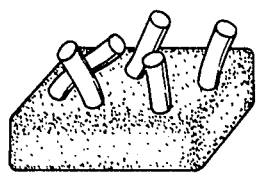
Figure 13:
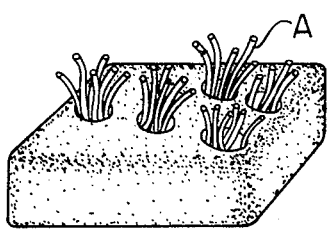

FIG. 5 is a sectional view of a sheet substance composed of the fibrous material shown in FIG. 4 and a second impregnating substance embedding the above-mentioned fibrous material, FIG. 6 is a sectional view of a unit of a composite substance of the present invention produced by removing the first impregnating substance from the sheet substance shown in FIG. 5, FIG. 7 is an enlarged perspective view of a part of the composite sheet substance composed of a plurality of units shown in FIG. 6, FIGS. 8, 10, and 12 are perspective views of the composite sheet substance still containing components B and C, FIGS. 9, 11 and 13 are perspective views of the composite sheet substance after removing the B and C component, according to the present invention.

In general, the process of producing the composite sheet substance according to the present invention comprises the following five steps:

(1) The first step comprises making a bonded fibrous material composed of a plurality of fine fiber-components gathered in a bundle and another component bonding the above-mentioned fine fibers. These fine fibers are referred to as the "A component" while the term "B component" is used to refer to the above-mentioned bonding component. The dissolving properties of these two components A and B is a solvent different from each other, and a certain synthetic fiber-forming polymer is preferably used for the A component while another synthetic polymer is used for the B component. Several examples of the configuration of the bonded fibrous material are shown in cross-section in FIGS. 1A to 1O. That is, typical models of the configuration are shown in FIGS. 1A and 1B. A configuration having a distribution of the A component is shown in FIG. 1C, and irregular cross sectional profile is shown in FIG. 1D, a configuration having nonuniformities of fineness and shape of the cross section of the A component is shown in FIG. 1E and 1F, a configuration having the A component comprising several groups of different fineness is shown in FIG. 1G, a configuration containing two kinds of A component is shown in FIG. 1H, a configuration having the A component arranged in a radial condition is seen in FIG. 1I, a configuration having an irregular cross sectional profile is shown in FIGS. 1J and 1K, a configuration containing the A component gathered in a biased condition is seen in FIG. 1L, a configuration containing the A component composed of several groups of fibers having different fineness and arranged in a concentric condition is shown in FIG. 1M, a configuration containing the A component composed of a plurality of components adhered side by side is seen in FIG. 1N, and a configuration containing numerous very fine fibrous A components having a thickness below 0.1 denier is shown in FIG. 1O. The typical arrangement of the A component is also shown in FIG. 2. Next, a sheet substance is produced from the above-mentioned bonded fibrous material by any well-known apparatus such as a card, cross lapper, random webber and paper machines, or the conventional method used for manufacturing nonwoven fabric may be used, such as needle punching, stitching, felting and direct sheeting disclosed in as U.S. Pat. 3,338,992, and 3,341,394.

(2) In the second step, the sheet substance is impregnated and covered with a liquid containing a polymer which is referred to hereinafter as the "C component" so as to cover the bonded fibrous material. The solvent dissolving property of the C component in solvent is different from that of the A and B components. One example of the cross section of the bonded fibrous material covered by the C component is shown in FIG. 3.

(3) Next, the B component in the bonded fibrous material is removed from the resulting material product of the second step by a solvent which dissolves the B component only. The bonded fibrous material is thereby converted to a bundle of fine fibers composed of the A component. One example of the cross section of the resultant bundle covered to the C component is shown in FIG. 4.

(4) The fourth step is a second impregnating process of the resultant product material of the third step with an elastic polymer. This elastic polymeric material is referred to hereinafter as the "D component." Through this treatment, the resultant product of the third step is covered by the elastic polymer as shown in FIG. 5. The impregnation of the result of the third step with the D component is effected for enhancing the bonding of the fine fiber bundles and imparting a suitable genuine leather-like softness. A solution or dispersed solution mainly containing a polymeric material having superior elasticity is preferably utilized as the D component.

(5) Next, the C component is removed from the resultant product of the fourth step by dissolving off in a solvent which can dissolve only the C component but not the A and D components. One example of the resultant product of the fifth step is clearly shown in FIGS. 6 and 7. The A component fine fibers in the resultant product of the fifth step composed of have a certain extent of freedom of relative movement with respect to each other and the D component has sufficient elasticity, when the resultant product of the fifth step is subjected to a certain deformation the above-mentioned drawbacks of the conventional synthetic leather.

The component fine fibers in the bonded fibrous material are continuously extended along the length of the bonded fibrous material and bonded by the B component as described above. Therefore, a unit of the bonded fibrous material forms a continuous strand.

Some modified types of arrangement of the A component fine fibers in the bonded fibrous material may be applied to the present invention. For instance, the fine fibers of the A component distributed in an irregular condition in the B component, whether in the way of a continuous arrangement or discontinuous arrangement, can be used for the present invention.

Almost all of the fiber-forming thermoplastic synthetic polymer such as nylon 6, nylon 66, nylon 12, copolymerized polyamides of the above, polyethylene terephthalate, copolymerized polyesters, polyethylene-oxide, polyethylene, polypropylene, polyurethane, and other vinyl polymers etc., can be used as the material of the A component. Further the A component may be prepared also from polymeric mixtures consisting of at least two different polymeric materials each having different dissolving properties from that of the B component. In any case the B component is mostly removed by dissolving off or decomposing, thereby the A component is converted to a bundle of fine fibers having a freedom of movement relative to each other for permitting the fibers to move a certain extent when an external force such as a bending force, acts upon the resultant product.

As mentioned above, any polymer having the fiber forming property, a solvent soluble property different from that of the A component, and a bonding property for the A component fibers may be used for forming the B component.

The bonded fibrous material can have a thickness in a range between 1.0 and 20 denier, however the thickness for 3 to 7 denier is preferable for the present invention. It is preferable that the A component is composed of at least two fine fibers, and more preferably, five or more fine fibers. The thickness of A component fine fibers may be in a range between 0.5 and 0.005 denier. However, the thickness of from 0.1 to 0.01 denier is desirable in order to attain the object of the present invention.

In the practical process of the present invention, the bonded fibrous material can be produced by several ways, that is, the A and B component polymeric melts are incorporated in a side-by-side type form or a core-in-sheath type form. Then this incorporated polymer melt is extruded through a spinneret provided with a plurality of orifices in order to spin a plurality of bonded fibrous materials in a bundled form, and then the bonded fibrous material is subjected to a conventional drawing so as to impart a suitable orientation. Generally, the bonded fibrous material produced by the above-mentioned first step is cut at a length in a range preferably between 10 and 100 mm.

Next, a sheet such as web, felt or needle punched web is produced from the bonded fibrous materials of the present invention.

It is well-known that the above-mentioned sheet can be produced by the conventional machine such as card, cross-lapper, random-webber etc., or by utilizing an air jet or the direct sheeting process wherein spun filaments are directly sheeted for manufacturing the nonwoven fabric continuous or discontinuous sheet material produced by the above-mentioned methods is used for manufacturing the composite substance of the present invention.

It is also preferable to use the sheet reinforced needle punching process, in this case the punch-density is in a range between 200 and 1,000 needles/$cm.^2$. Further, a superimposed web containing woven fabrics, knitted fabrics or nonwoven fabrics may be used for the present invention instead of using the above-mentioned sheet.

As already illustrated, since the C component has a soluble property in a solvent different from that of the A and B components in the same solvent, the C component can be removed from the resultant product of the fourth step by dissolving same off in a solvent which never dissolves the A and B components. A polymer substance having the water soluble property is preferably used for forming the C component in order to save the production cost and to obtain easy handling on an industrial scale. For example, polyvinyl alcohol, carboxymethylcellulose, casein, polyvinylmethylether, starch, polyethyleneoxide, sodium polyacrylate etc. is suitable as for forming the C component.

The above-mentioned second step for first impregnating or covering the bonded fibrous material sheet is carried out by means of spraying, dipping or coating. In the second step, it is preferable that the content of the C component in the resultant product of the second is in a range between 3 and 50 percent based on the weight of the primary sheet.

The solvent for dissolving off the C component must be different from the solvent for the A and B components. If the C component has a water soluble property, the solvent of the B component is required to have no dissolving property for the C component. For instance, in case the B component consists of polystyrene which is a non-polar compound, the C component should consist of a water-soluble substance or an alkali soluble substance.

The third step is generally carried out by dipping the resultant product effective for the second step in a solvent of the B component, and further an additional means of heating or shaking the solvent may be applied for the process.

In the fourth step, the resultant, intermediate product of the third step consisting of the A component and the C component is treated in a solution dispersion or emulsion of the elastic polymer which is the D component. Any one of the bonding agents which are normally used for treating the conventional nonwoven fabric, such as polychloroprene-rubber, styrene-butadiene rubber, acrylonitrile-butadiene rubber, polyurethane, plasticized polyvinyl chloride and other synthetic rubbers, and natural rubber may be used as the D component. Further it is interesting to note that any solvent without the dissolving property of the C component can be used as a solvent for the D component.

The well-known spraying, dipping or coating methods can be applied to perform the fourth step and the solvent is then removed by evaporation or coagulation in a desolution bath (such as water, alcohol, polyethylene glycohol and aqueous salt solution). Through the fourth step, the solidification of the D component polymer and the adhesion of the D component polymer to the resultant product of the third step is satisfactorily performed. The D component polymer having porous configuration is obtained after the solidification.

The fifth step is carried out by means of dipping the resultant product of the fourth step into a solvent which does not decompose the A and D components but effectively dissolve only the C component, and the above-mentioned additional means of heating or shaking the solvent may be applied to accelerate the process, if necessary.

If the C component is water soluble, the fifth step can be advantageously processed by means of using water or hot-water as the solvent for removing the C component on an industrial scale. As a special case, this fifth step comprises removing the C component by a liquid in which the D component is coagulated at the fourth step.

It must be noticed that the second step is one of the essential steps of the present invention, because if the second step is omitted, it is impossible to achieve the purpose of this invention. For the A component, fine fibers are firmly fixed together with an elastic polymer when the fourth step is carried out. Accordingly to this invention, the fourth step can be carried out very easily by means of maintaining this condition of the bundle of fibers so as to produce the sheet composite substance having excellent resistance to bending fatigue together with similar softness as that of natural leather.

The function of the third step is to remove the B component without trouble. That is, if the third step for removing the B component is carried out after the fourth step, it is quite troublesome to choose the solvent of the B component and the dissolving speed of the B component slows down to such an extent that it becomes almost impossible to carry out the process on an industrial scale. Further, and additional substance of the D component can be safely reserved in the D component during the dissolving operation of the B component. The third step for removing the B component is an essential one to maintain the dimensional stability of the bundle of fibers and to prevent any large change of the apparent density of the final product of the present invention. Consequently, the above-mentioned five steps for manufacturing the composite substance of the present invention may be changed so that the combination of steps is in the following combined order (1)–(3)–(2)–(4)–(5).

The composite substance produced by the present method, in case very fine fibers are used for the A component, results in many fibers being almost free from contact with the D component and arranged with numerous free portions. Therefore, the composite substance thus produced has an excellent handling quality, feeling and toughness which are similar to the characteristics of genuine leather.

The above-mentioned five steps may be performed in a continuous process. Further, additional mechanical operations such as heat pressing, buffing, coating operation, finishing treatment by certain materials such as softener, water repellants, water proofing agents, antistatic agents, antisoiling agents etc., and dyeing of the sheet after removing the C component may be added if such is required.

The following examples illustrate various methods of producing a composite sheet substance in accordance with this invention and show the effects of the steps and the quality of the products.

EXAMPLE 1

(Step 1).—The bonded fibrous material composed of polyethylene-terephthalate (A component) and polystyrene (B component) was produced in a fiber shape. The content ratio of the A component and B component was 60/40 in weight ratio. An individual fiber material contained forty-two fine fibers of the A component arranged along its axial direction. The fiber was in a staple fiber of 51 mm. length and 3 denier fineness together with crimps of 12/25.4 mm. A web was produced by means of the conventional card and cross lapper method from the above-mentioned fiber and the web was subjected to a needle punching process which was operated in a condition of 8 mm. depth of the needle punch with a density of 600 needles/cm.$^2$. The weight of the nonwoven material after the needle punching process was 400 g./m.$^2$.

(Step 2).—The nonwoven material was first impregnated with an aqueous solution containing 10 percent polyvinylalcohol, then subjected to a squeezing operation so as to squeeze the material at a squeezing ratio of 100% and next, the material was dried.

(Step 3).—The resultant product of Step 2 was dipped into a trichloroethylene so as to dissolve the B component. The fiber concentration in the trichloroethylene was 2%. After treating the material in the trichloroethylene for 30 minutes at room temperature, the material was squeezed by a squeezing mangle and dipped into methylalcohol immediately, thereby the remaining polystyrene (B component) was coagulated and removed. 95% of the theoretical content of the B component of polystrene was removed from the material.

(Step ).—The resultant product of the third step was subjected to a second impregnating step with dimethylformamide solution containing 20% polyurethane (hereinafter referred to as PU)/polyacrylonitrile-butadiene copolymer (hereinafter referred to as NBR) in a ratio of 75 parts/25 parts in weight, and squeezed at a squeezing ratio of 250%. The squeezing operation was carried out very easily by means of a conventional mangle. Thereafter, the nonwoven fabric was dipped into a water bath containing a large quantity of water, thereby the copolymer of PU/NBR was coagulated and fixed in the nonwoven fabric.

(Step B).—The product of the fourth step was treated in hot-water for 30 minutes at 90° C. whereupon the polyvinylalcohol was dissolved and removed in the hot water.

(Step 6).—After drying the product of the fifth step, a buffing operation of the product was carried out and a product having a similar soft hand-feeling and appearance to the so-called suede like leather was produced.

EXAMPLE 2

In the above-mentioned Example 1, the order of Steps 2 and 3 was reversed. That is, the nonwoven fabric produced by Step 1 was dipped into a solution of trichloroethylene in a condition of 2% fiber concentration for 30 minutes, thereby the polystyrene was dissolved into the trichloroethylene and removed from the nonwoven fabric. This treatment was carried out at room temperature. 98% of the theoretical content of the polystyrene was removed from the nonwoven fabric. Next the resulting product of the above-mentioned treatment was dipped into a water solution containing 10% of polyvinylalcohol, and then squeezed at a squeezing ratio of 100% and dried. The polyvinylalcohol of 10% based on the weight of the nonwoven fabric remained in the fabric. The succeeding steps after Step 3 were carried out in the same manner as shown in Example 1. Finally, a synthetic leather having a suede like handling quality and appearance was produced. But the bulkiness of the product was slightly inferior to the product of Example 1.

COMPARATIVE EXAMPLE 1

The nonwoven fabric produced by the (Step 1) of Example 1 was used for the experiment. The treatment of Step 4 was directly carried out on the above-mentioned nonwoven fabric. However, and in this example, it was almost impossible to carry out the squeezing operation because of the idle running of the squeezing roll. It was understood that the above-mentioned trouble was mainly caused by the swelling or dissolving of polystyrene by dimethylformamide (DMF) and easy deformation of the nonwoven fabric. Next, the nonwoven fabric was removed from the squeezing roll, and small pieces of the nonwoven fabric containing PU/NBR and DMF were obtained. These small pieces of fabric were dipped into a water bath containing a large quantity of water so as to coagulate and set the copolymer of PU/NBR. Then polystyrene was removed from the fabric under the same conditions as Step 3 of Example 1. Only 65% of the theoretical content of polystyrene was taken out. After washing the fabric test piece by methylalcohol and water, the test piece was dried and subjected to a buffing operation. The final product had a suede like appearance, however, a very roughened surface and very stiff hand-feeling were observed in comparison with the product of Example 1.

EXAMPLE 3

(Step 1).—A bonded fibrous material in a staple form was used for producing the nonwoven fabric. The fibrous material was composed of polyethylene terephthalate (A component) and polycaprolactam (B component) in a composite ratio in weight of 50/50. The individual bonded fibrous material contained forty-two very fine fibers and its length was 51 mm., its thickness was 3 denier, and crimps of 12/25.4 mm. were provided. The nonwoven fabric was produced in the same manner as Example 1.

(Step 2).—The nonwoven fabric of Step 1 was dipped into formic acid, thereby the polycaprolactam was dissolved and taken out. The fiber content in the formic acid solution was 2% and the above-mentioned treatment was then carried out for one hour at 50° C. The quantity of the polycaprolactam was the same calculated amount. Next, the nonwoven fabric was washed in water.

(Step 3).—The fabric, after Step 2, was dipped into a solution of 15% polyethylene oxide and then squeezed at a squeezing ratio of 100%.

The succeeding treatments after Step 3 were carried out in the same manner as in Example 1, except that the DMF solution containing 20% PU was used as the D component. The final product had a handling quality, appearance and other physical properties similar to those of genuine suede leather.

EXAMPLE 4

(Step 1).—A bonded fibrous material in a staple form was used for producing the nonwoven fabric. The fibrous material was composed of polyethylene terephthalate (A component) and polystyrene (B component) in a composite ratio in weight of 50/50. The individual bonded fibrous material contained fifteen very fine fibers and its length was 51 mm., its thickness was 3 denier, and further, crimps of 12/25.4 mm. were provided. The weight of the nonwoven fabric was 400 g./m.$^2$.

(Step 2).—The nonwoven fabric of Step 1 was dipped into a solution of 7% polyvinylalcohol and dried so as to contain 7% polyvinylalcohol in the fabric.

(Step 3).—Polystyrene was taken out from the nonwoven fabric in the same manner as Step 3 of Example 1.

(Step 4).—The nonwoven fabric produced by the treatment of Step 3 was dipped into a solution of DMF containing 10% copolymer composed of polyurethane and NBR at a composed ratio in weight of 75/25. Next, the nonwoven fabric was squeezed by a mangle at a squeezing ratio of 250% and was then subjected to a coating operation by a coating substance mainly containing a polyurethane polymer. The above-mentioned polyurethane polymer was prepared as follows: Polytetrahydrofuran having molecular weight of 2,250 was additionally polymerized with diphenylmethane PP' diisocyanate and further provided with chain-propagation by hydrazine so as to produce polyurethane. The above-mentioned polyurethane polymer was prepared by mixing the above-mentioned polyurethane, polyvinylchloride having molecular weight 600, DOP, DMF and water at a mixing ratio of 200:60:30:685:2 parts, thereby polyurethane copolymer having the viscosity of 1,000 poise was obtained.

The coating operation was carried out by means of a so-called knife-coater and the thickness of the coated substance after drying was controlled so as to obtain a thickness of 0.4 mm. Next, the coated fabric was dipped into a water bath containing a large quantity of water so as to coagulate and fix the polyurethane component.

(Step 5).—The product of Step 4 was treated in hot-water for 30 minutes at 90° C., thereby polyvinylalcohol was dissolved and removed from the fabric. Next, after the drying operation, the product was painted with a dyestuff and subjected to an emboss finishing operation. The final product had an excellent calf leather like appearance and soft handling quality. The practical use of the product as a material for shoes has proved its excellent quality.

COMPARATIVE EXAMPLE 2

The same bonded fibrous material as Example 4 was used for this experiment and after the same treatment as Step 2 of Example 4 was carried out, the same treatment as Step 4 of Example 4 was carried out. After the abovementioned treatment, the same treatment as Step 3 of Example 4 was carried out, thereby polystyrene was dissolved and taken out from the nonwoven fabric. A part of the polyvinylchloride contained in the coated substance was dissolved in trichloroethane. Next, the same treatment as Step 5 of Example 4 was carried out so as to dissolve the polyvinylalcohol and the same finishing as Example 4 was carried out. The final product of this experiment had hard handling quality, poor appearance and physical properties, because a portion of polyvinyl-chloride or DOP was dissolved many creases were noticed on the surface of the product.

EXAMPLE 5

(Step 1).—A bonded fibrous material in a staple form was prepared. The fibrous material was composed of nylon 6 (A component) and polystyrene (B component) in a composite ratio in weight of 50/50. The individual bonded fibrous material contained forty-two fine fibers and its length was 51 mm., its thickness was 3.5 denier, and crimps of 12/25.4 mm. were provided. The nonwoven fabric was produced by a similar treatment as in Example 1.

(Step 2).—The above-mentioned nonwoven fabric was dipped into a solution of 10% polyvinylalcohol and next, squeezed at a squeezing ratio of 100% and then dried.

(Step 3).—The product of Step 2 was dipped into a trichloroethane bath containing 50 times the quantity of weight of the nonwoven fabric, thereby the polystyrene was dissolved and removed. That is, after dipping in the solution for 30 minutes at 50° C., the product was squeezed and next dipped into methylalcohol. By this treatment, almost the calculated quantity of polystyrene (B component) was dissolved and taken out.

The succeeding steps were carried out in the same manner as Example 1. The final product has very similar appearance and physical properties as those of genuine suede leather, particularly it was softer than the product of Example 1. Further, this product had a high dyeability with acid dyestuff, therefore, many suitable colors of the product were satisfactorily obtained.

EXAMPLE 6

The bonded fibrous material composed of nylon 66 (A component) and polystyrene (B component) in a composite ratio in weight of 50/50 was produced. The individual bonded fibrous material contained fifteen fine fibers and its length was 36 mm., its thickness was 4 denier, further and crimps of 12/25.4 mm. were provided. The succeeding steps were carried out in the same manner as done in Example 5. The final product had excellent properties similar to those of Example 5.

EXAMPLE 7

In Example 6, nylon 12 was used as the A component instead of nylon 66. Other factors for manufacturing the synthetic leather were the same as Example 6 and the treatment of each of the steps was carried out similarly to Example 6. The final product had excellent properties as obtained in Example 6.

EXAMPLE 8

In Example 6, a mixture of nylon 6, 10 was used as the A component instead of nylon 66. Other factors were the same as Example 6 and the synthetic leather was produced in the same steps as Example 6. The final product had excellent properties as Example 6.

EXAMPLE 9

In Example 1, polyethylene terephthalate copolymer containing isophthalic acid of 4.9 mol percent was used as the A component instead of polyethylene terephthalate and the B component was removed in carbontetrachloride. Other factors and steps were similar to Example 1, except the drying operation after Step 3 was carried out at 160° C. so as to create an area shrinkage of 50%. The final product had a higher density and stiffness than Example 1, the appearance and hand feeling of the product were similar to genuine suede.

EXAMPLE 10

In Example 6, low pressure polyethylene was used as the A component instead of nylon 66. Other factors were the same as Example 6. All steps were carried out in the similar manner to Example 6. The final product was a similar appearance and hand feeling to genuine suede leather.

EXAMPLE 11

In Example 10, polypropylene of fiber grade was used as the A component instead of the low pressure polyethylene and all steps were carried out in a same manner as that of Example 10. The final product had similar qualities as Example 10.

EXAMPLE 12

In Example 1, polyethylene terephthalate copolymer containing isophthalic acid of 4.9 mol percent was used as the A component, styrene-acrylonitrile copolymer was used as the B component. Further, in Step 3, the B component was dissolved by trichloroethylene for 30 min. at 50° C. The calculated content of the B component was almost dissolved and taken out. Another treatment of the steps were carried out in the same way as Example 1. The final product was similar in excellent qualities as Example 1.

EXAMPLE 13

In Example 12, polyethylene terephthalate was used as the A component, styrene acrylic acid copolymer was used as the B component. Other factors were the same as in Example 12. All treatment of the steps were carried out in the same manner as Example 12 and an artificial leather having similar excellent qualities to Example 12 was produced.

EXAMPLE 14

In Step 2 of Example 1, 10% solution of carboxymethylcellulose was used instead of polyvinylalcohol. Other steps were carried out in the same manner as Example 1. The final product as synthetic leather had excellent qualities as Example 1.

EXAMPLE 15

In Step 2 of Example 14, 10% solution of soluble starch was used instead of carboxymethylcellulose. Other steps were carried out in the same manner as Example 14. The synthetic leather having similar qualities to Example 14 was produced.

EXAMPLE 16

(Step 1).—A bonded fibrous material in a staple form was produced. The fibrous material was composed of dope dyed polyethylene terephthalate containing 5% carbon black (A component) and polystyrene (B component) in a composite ratio in weight of 50/50. The individual bonded fibrous material contained forty-two fine fibers and its length was 51 mm., its thickness was 4 denier, and crimps of 12/25.4 mm. were provided. The nonwoven fabric was produced in the same manner as the steps from 1 to 3 in Example 1.

(Step 4).—Natural rubber (grade RSS #1) was treated by the first operation of mastication and next dissolved in a benzene solution. The concentration of the rubber in the benzene solution was 10%. The product of Step 3 was dipped into the above-mentioned benzene solution. After squeezing the fabric at the squeezing ratio of 300%, the fabric was dried by steam-heat so as to evaporate the benzene.

After Step 4, the same treatments as performed in Example 1 were successively carried out. The synthetic leather having a similar appearance and physical properties to genuine suede leather was produced.

EXAMPLE 17

In Example 16, styrene-butadiene rubber was used instead of natural rubber. A synthetic leather having an excellent quality was produced by the same treatments as Example 16.

EXAMPLE 18

In Example 16, chloroprene rubber was used instead of natural rubber. A synthetic leather having an excellent suede like quality was produced by the same treatments as Example 16.

EXAMPLE 19

In Step 4 of Example 16, the gelation of a mixture composed of 100 parts of polyvinylchloride and 60 parts of dioctylphthalate was carried out by means of roll mixing under heat. Next, the gel mixture was dissolved by methyl ethyl ketone in order to obtain a 15% solution. The above-mentioned solution was used instead of the benzene solution containing natural rubber. Other treatments were carried out in the same manner as Example 16, and a synthetic leather having excellent quality was produced.

EXAMPLE 20

(Step 1).—A mat was produced by a direct sheeting process comprising a melt spinning and drawing process. In the above-mentioned process, polyethylene terephthalate was used as the A component while polystyrene was used as the B component. The content ratio of the A and B components by weight was 50/40, the bonded fibrous material in a filament form contained fifteen fine fibers arranged along its axial direction and its fineness was almost 2 denier. Eight mats, each having a weight of 50 g./m.², were superimposed with each other and provided with needle punchings.

The succeeding treatments after Step 2 were carried out in the same manner as Example 1 and a very high quality of synthetic leather as that of Example 1, was produced.

EXAMPLE 21

(Step 1).—Two kinds of bonded fibrous materials were produced. One of the materials was composed of polyurethane (A component) and polystyrene (B component) in a composite ratio in weight of $A/B=20/80$. The individual fibers of the material contained fifteen fine fibers and its thickness was 4 denier and its length was 51 mm., and crimps of 12/25.4 mm. were provided. Another material was composed of polyethylene terephthalate (A component) and polystyrene (B component) in a composite ratio in weight of $A/B=60/40$. The individual fibers of this material contained forty-two fine fibers and its thickness was 4 denier and its length was 51 mm., and crimps of 12/25.4 mm. were provided. The above-mentioned bonded fibrous materials were blended before producing a nonwoven fabric in a blending ratio of 20 parts (the first material) with 80 parts (the second material).

The treatments of Steps 2 and 3 were carried out in the same manner as Example 1.

(Step 4).—The nonwoven fabric product of Step 3 was dipped into a benzene solution prepared in the same manner as Example 16, and squeezed at a squeezing ratio of 300%. Next the benzene was evaporated from the squeezed product so as to produce a composite substance composed of the nonwoven fabric and the natural rubber.

After this treatment, all succeeding treatments were carried out in the same manner as Example 1. The final product was very soft and had excellent qualities of appearance and hand-feeling which are similar to those of genuine suede leather.

EXAMPLE 22

In the same manner as Example 21, two kinds of bonded fibrous materials were produced. One of the materials was composed of polyester (A component) and polystyrene (B component) in a composite ratio in weight of 45/55. The other material was composed of polyamide (A component) and polystyrene (B component) by a composite ratio in weight of 45/55. Each individual fiber of the materials contained fifteen fine fibers and its thickness was 3 denier. A felt composed of the abovementioned material mixed in a mixing ratio 50/50 was produced. All the treatments of the steps were carried out in the same way as Example 1 and a synthetic suede leather having sufficient tenacity for end uses and a very soft hand-feeling as genuine leather was produced.

EXAMPLE 23

The bonded fibrous material composed of polyethylene terephthalate and polyamide (A component) and polystyrene (B component) was produced in a fiber shape. The content ratio of polyethylene terephthalate and polyamide was 50/50 in weight ratio and the content ratio of the A component and B component was 60/40 by weight ratio. Other factors for manufacturing the synthetic leather were the same as Example 1 and the treatment of each step was carried out similarly to Example 1. The final product had excellent properties similar to Example 1.

The following table shows the mechanical properties of the products of the above-mentioned examples.

| Example | Softness measured by bending modulus at 20% tensile elongation in kg./cm.³ | Tensile Strength, kg./cm.³ | Elongation in percent |
|---|---|---|---|
| 1 | 64.8 | 159.0 | 46.0 |
| 2 | 75.2 | 160.0 | 48.0 |
| Comparative Example 1 | 320.0 | 160.0 | 68.0 |
| 3 | 63.0 | 116.0 | 42.0 |
| 4 | 80.5 | 136.7 | 45.8 |
| Comparative Example 2 | 730.0 | 122.0 | 50.0 |
| 5 | 60.3 | 153.0 | 56.8 |
| 6 | 72.3 | 158.0 | 48.3 |
| 7 | 75.3 | 146.0 | 46.0 |
| 8 | 82.3 | 140.5 | 37.2 |
| 9 | 61.3 | 130.0 | 48.0 |
| 10 | 85.3 | 133.0 | 49.3 |
| 11 | 93.2 | 136.0 | 50.3 |
| 12 | 62.5 | 131.0 | 47.5 |
| 13 | 65.6 | 148.7 | 47.0 |
| 14 | 64.9 | 159.0 | 47.0 |
| 15 | 63.8 | 155.0 | 48.0 |
| 16 | 67.3 | 156.3 | 45.7 |
| 17 | 64.4 | 153.0 | 46.3 |
| 18 | 68.5 | 161.0 | 51.3 |
| 19 | 66.6 | 153.0 | 47.5 |
| 20 | 64.6 | 121.0 | 47.0 |
| 21 | 50.3 | 87.0 | 47.0 |
| 22 | 63.0 | 146.0 | 50.3 |
| 23 | 62.0 | 130.0 | 49.5 |

Since many different embodiments of the invention may be made without departing from the spirit and scope thereof, it is to be understood that the invention is not limited by the specific illustrations except to the extent in the following claims.

What is claimed is:

1. A method of producing a composite sheet substance consisting of numerous bundles of polymeric fibers or filaments and an elastic polymeric substance comprising the following successive steps: (1) impregnating a primary sheet substance composed of polymers A and B with polymer C wherein said sheet substance comprises numerous bonded fibrous materials each consisting of a plurality of fibrous polymers A extending in a longitudinal direction and contained within a bonding polymer B having a dissolving property in a solvent different from that of said polymer A and wherein said polymer C has a dissolving property in a solvent different from that of said polymers A and B; (2) removing said bonding polymer B from the resultant product of said step (1) by dissolving off said bonding polymer B with a solvent capable of dissolving only said bonding polymer B but not said polymers A and C to eeffctively convert said numerous bonded fibrous materials into numerous bundles of said polymer A; (3) impregnating the resultant product of said step (2) with a liquid mainly containing an elastic polymer D; and (4) removing said polymer C from the resultant product of said step (3) by dissolving off said polymer C with a solvent capable of dissolving only said polymer C but not said polymers A and D to produce a composite sheet substance comprising bundles of said polymer A and said elastic polymer D.

2. A method according to claim 1, wherein each said bonded fibrous material comprises at least two kinds of said polymer A consisting of polymers different from each other.

3. A method according to calim 1, wherein said primary sheet substance comprises at least two kinds of said bonded fibrous materials comprising polymers A different from each other and a common polymer B.

4. A method according to claim 1, wherein said fibrous polymers A are selected from the group consisting of fiber-forming thermoplastic synthetic polymers copolymerized polyamides, polyethylene terephthalate, copolymerized polyesters, polyethylene oxide, polyethylene, polypropylene, polyurethane, other vinyl polymers and mixtures of the above.

5. A method according to claim 1, wherein said bonded fibrous materials have a thickness of 10 to 20 denier.

6. A method according to calim 5, wherein said bonded fibrous materials have a thickness of 3 to 7 denier.

7. A method according to claim 1, wherein said fibrous polymers A have a thickness of 0.5 to 0.005 denier.

8. A method according to claim 1, wherein said fibrous polymers A have a thickness of 0.1 to 0.01 denier.

9. A method according to claim 1, wherein said primary sheet substance is a non-woven fabric prepared by needle-punching at least one web formed from said bonded fibrous materials.

10. A method according to claim 9, wherein said web is superimposed with at least one member selected from woven fabric, knitted fabric, and non-woven fabric.

11. A method according to claim 1, wherein said bonding polymer B consists of polystyrene, polycaprolactam, styrene-acrylonitrile copolymer or styrene-acrylic acid copolymer.

12. A method according to claim 1, wherein said polymer C is a water soluble polymer selected from the group consisting of polyvinyl alcohol, carboxymethyl cellulose, casein, polyvinyl methylether, starch, polyethylene oxide, and sodium polyacrylate.

13. A method according to claim 1, wherein said polymer C is applied in a content of 3 to 50% based on the weight of said primary sheet material.

14. A method according to claim 1, wherein said elastic polymer D is selected from the group consisting of polychloropropylene-rubber, styere-butadiene rubber, acrylonitrile-butadiene rubber, polyurethane, plasticized polyvinyl chloride, other synthetic rubber and material rubber.

15. A method according to claim 1, wherein said resultant product of said step (2) is subjected to shrinking of said bundles of said components A.

16. A method according to claim 1, wherein said resultant product of said step (4) is coated with an elastic polymer.

17. A method of producing a composite sheet substance consisting of numerous bundles of polymeric fibers or filaments and an elastic polymeric substance comprising the following successive steps: (1) treating a primary sheet substance composed of numerous bonded fibrous materials each consisting of a plurality of fibrous polymers A extending in a longitudinal direction and contained within a bonding polymer B having a dissolving property in a solvent different from that of said polymer A with a solvent capable of dissolving off only said bonding polymer B but not said polymer A to effectively remove said polymer B from said numerous bonded fibrous materials to convert same into bundles of said polymer A; (2) impregnating the resultant product of said step (1) with polymer C having a dissolving property in a solvent different from that of said polymer A; (3) impregnating the resultant product of said step (2) with a polymeric material mainly containing an elastic polymer D; and (4) removing said polymer C from the resultant product of said step (3) by dissolving off said polymer C with a solvent capable of dissolving only said polymer C but not said polymers A and D to produce a composite sheet substance comprising bundles of said polymers A and said elastic polymer D.

18. A method according to claim 17, wherein each said bonded fibrous material comprises at least two kinds of said polymer A consisting of polymers different from each other.

19. A method according to claim 17, wherein said primary sheet substance comprises at least two kinds of said bonded fibrous materials comprising polymers A different from each other and a common polymer B.

20. A method according to claim 17, wherein said fibrous polymers A are selected from the group consisting of fiber-forming thermoplastic synthetic polymers copolymerized polyamides, polyethylene terephthalate, copolymerized polyesters, polyethylene oxide, polyethylene, polypropylene, polyurethane, other vinyl polymers and mixtures of the above.

21. A method according to claim 17, wherein said bonded fibrous materials have a thickness of 1.0 to 20 denier.

22. A method according to claim 21, wherein said bonded fibrous materials have a thickness of 3 to 7 denier.

23. A method according to claim 17, wherein said fibrous polymers A have a thickness of 0.5 to 0.005 denier.

24. A method according to claim 17, wherein said fibrous polymers A have a thickness of 0.1 to 0.01 denier.

25. A method according to claim 17, wherein said primary sheet substance is a non-woven fabric prepared by needle-punching at least one web formed from said bonded fibrous materials.

26. A method according to claim 24, wherein said web is superimposed with at least one member selected from woven fabric, knitted fabric, and non-woven fabric.

27. A method according to claim 17, wherein said bonding polymer B consists of polystyrene, polycaprolactam, styrene-acrylonitrile copolymer, or styrene-acrylic acid copolymer.

28. A method according to claim 17, wherein said polymer C is a water soluble polymer selected from the group consisting of polyvinyl alcohol, carboxymethyl cellulose, casein, polyvinyl methylether, starch, polyethylene oxide, and sodium polyacrylate.

29. A method according to claim 17, wherein said polymer C is applied in a content of 3 to 50% based on the weight of said primary sheet material.

30. A method according to claim 17, wherein said elastic polymer D is selected from the group consisting of polychlorophenylene-rubber, styrene-butadiene rubber, acrylonitrile-butadiene rubber, polyurethane, plasticized polyvinyl chloride, other synthetic rubber and material rubber.

31. A method according to claim 17, wherein said resultant product of said step (1) is subjected to shrinking of said bundles of said fibrous polymers A.

32. A method according to claim 17, wherein said resultant product of said step (4) is coated with an elastic polymer.

33. A method of producing a composite strip product composed of a plurality of relatively movable fibrous components confined by an elastic polymer material comprising: providing an elongated composite strip composed of a plurality of longitudinally extending fibrous components distributed in a spaced-apart relationship within a bonding material, said fibrous components being soluble in at least one solvent different than that which dissolves said bonding material; impregnating said strip with a polymeric material soluble in at least one solvent different than that which dissolves both said fibrous components and said bonding material; removing substantially all of said bonding material from the impregnated composite strip by dissolving said bonding material in a solvent effective to dissolve only said bonding material; then impregnating the composite strip with a liquid containing an elastic polymer material; and then removing substantially all of said polymeric material from the twice impregnated composite strip by dissolving said polymeric material in a solvent effective to dissolve only said polymeric material to produce a composite strip product composed of said plurality of longitudinally extending fibrous components confined by said elastic polymer material for relative movement in a transverse direction with respect to each other.

34. A method according to claim 33; wherein each of said fibrous components comprises at least five individual fibers bundled together.

35. A method according to claim 33; wherein each of said fibrous components comprises a plurality of individual fibers each composed of a thermoplastic synthetic polymer.

36. A method of producing a composite strip product composed of a plurality of relatively movable fibrous components confined by an elastic polymer material comprising: providing an elongated composite strip composed of a plurality of longitudinally extending fibrous components distributed in spaced-apart relationship within a bonding material, said fibrous components being soluble in at least one solvent different than that which dissolves said bonding material; removing substantially all of said bonding material from said composite strip by dissolving said bonding material in a solvent effective to dissolve only said bonding material; impregnating the remaining composite strip with a polymeric material soluble in at least one solvent different than that which dissolves said fibrous components; then impregnating the impregnated composite strip with a liquid containing an elastic polymer material; and then removing substantially all of said polymeric material from the twice impregnated composite strip by dissolving said polymeric material in a solvent effective to dissolve only said polymeric material to produce a composite strip product composed of said plurality of longitudinally extending fibrous components confined by said elastic polymer material for relative movement in a transverse direction with respect to each other.

37. A method according to claim 36; wherein each of said fibrous components comprises at least five individual fibers bundled together.

38. A method according to claim 36; wherein each of said fibrous components comprises a plurality of individual fibers each composed of a thermoplastic synthetic polymer.

References Cited
UNITED STATES PATENTS

| | | | |
|---|---|---|---|
| 3,011,929 | 12 1961 | Stalego | 156—155 X |
| 3,024,145 | 3/1962 | Nickerson | 156—155 X |
| 3,305,417 | 2/1967 | Christie | 156—155 X |

CARL D. QUARFORTH, Primary Examiner

S. J. LECHERT, JR., Assistant Examiner

U.S. Cl. X.R.

156—148, 155, 181, 250, 280, 296